W. M. THOMAS.
PHOTOGRAPHIC REELING APPARATUS.
APPLICATION FILED MAY 13, 1916.

1,317,404.

Patented Sept. 30, 1919.
2 SHEETS—SHEET 1.

Inventor
WILLIAM M. THOMAS

By Attorney
Robert Magrane

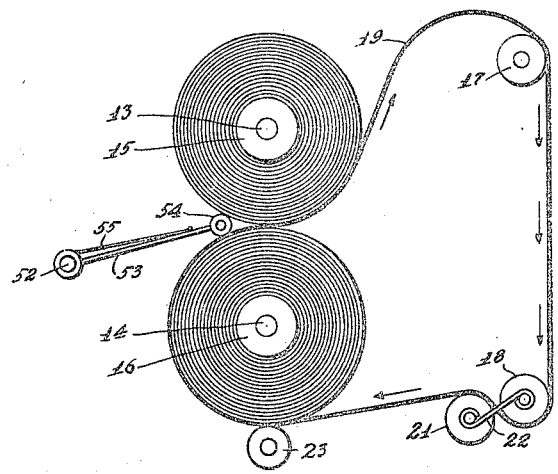
Fig:3.
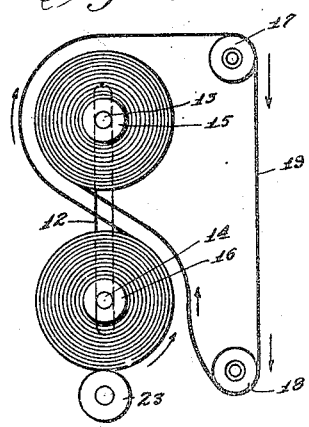
Fig:4.
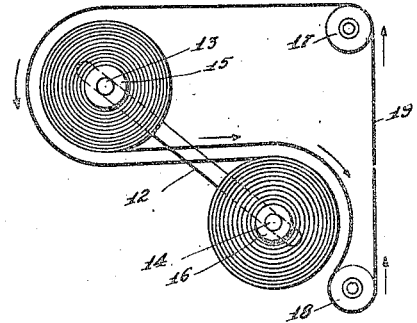
Fig:5.
WILLIAM M. THOMAS  Inventor

UNITED STATES PATENT OFFICE.

WILLIAM M. THOMAS, OF NEW YORK, N. Y., ASSIGNOR TO THOMAS-OBERKIRCH COMPANY, LIMITED, OF NEW YORK, N. Y., A CORPORATION OF NEW YORK.

PHOTOGRAPHIC REELING APPARATUS.

1,317,404.	Specification of Letters Patent.	Patented Sept. 30, 1919.

Original application filed April 29, 1914, Serial No. 835,095. Divided and this application filed May 13, 1916. Serial No. 97,302.

*To all whom it may concern:*

Be it known that I, WILLIAM M. THOMAS, a citizen of the United States, residing at New York, in the county and State of New York, have invented new and useful Improvements in Photographic Reeling Apparatus, of which the following is a specification.

This invention relates to reeling apparatus for photographic use with particular reference to film reeling mechanism for use in cameras for taking moving pictures and the like. This application is a divisional one, the subject matter herein being matter divided out of my co-pending application Serial No. 835,095, filed April 29, 1914.

The object of the invention is to provide a smaller and more compact film magazine for moving picture cameras so that the camera may be less bulky and unwieldy, this improvement being effected by the film reeling mechanism hereinafter described and claimed.

Referring to the drawings:

Fig. 3 is a diagrammatic view of the film rolls and spools illustrating the movement of the follower arm of the film indicator; and Figs. 4 and 5 are diagrammatic views of modified forms of reeling arrangements.

Figure 1:
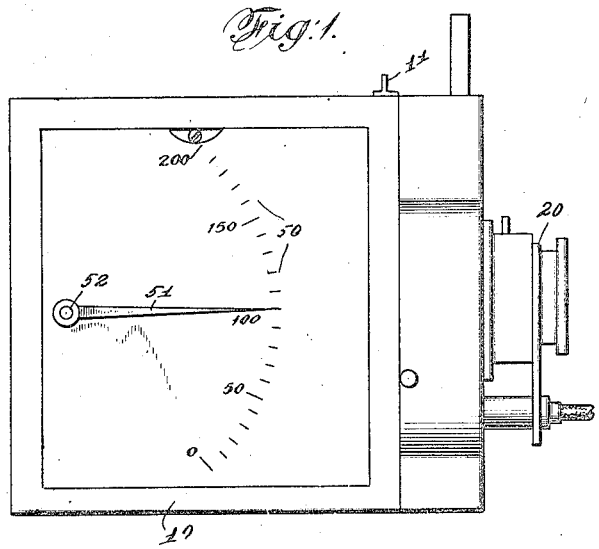
Figure 1 is a side elevation of the camera.
Figure 2:
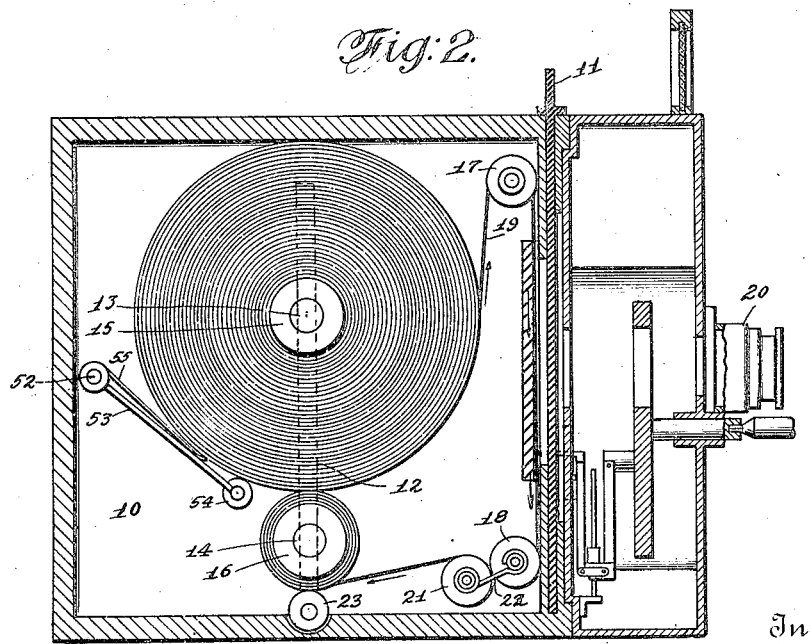
Fig. 2 is a side elevation partly in section.

The film magazine of the camera is indicated at 10 in Figs. 1 and 2, is of light-proof construction and is provided with a slide 11 so that the magazine may be detached from the remainder of the camera without exposing the film. As shown in Fig. 2, the side walls of the magazine are equipped with vertical slots as indicated at 12, and shafts 13 and 14, parallel with each other, are independently slidable in the slots 12. Film spools 15 and 16 are mounted respectively on shafts 13 and 14. Guide rolls 17 and 18 are provided to direct the film 19 in the focal plane of the lens 20. A compensating roll is indicated at 21 and is carried by spring arms, one of which is shown at 22. At the lower end of slots 12 and parallel with the spool shafts is a bearing roll 23 adapted to support the weight of the film and spools.

In operation, the film loaded spool is placed on the upper shaft, as shown in Fig. 2, the film threaded upon the rolls 17, 18, 21 and attached to the spool on the lower shaft. The upper spool with its film is in contact with and rests upon the lower spool, which in turn is supported by the bearing roll 23. When the film is moved in the direction of the arrows, by any suitable means, as a claw feed, the consequent rotation of the upper spool will cause the lower spool to rotate by its frictional contact therewith and the film will be wound up on the lower spool. During this transfer of the film there will be more or less relative movement of the shafts 13 and 14 with respect to each other, and there will also be a gradual movement upward of both shafts and spools within the compartment 10. An intermediate stage of the winding is indicated in Fig. 3.

A film indicator is provided comprising the scale 50, pointer 51 mounted upon shaft 52, which inside the compartment 10 carries a follower arm 53 equipped with a roll 54 bearing first upon the film in the upper roll and then upon that in the lower roll under the force of spring 55, the action being shown in Figs. 2 and 3.

Figs. 4 and 5 illustrate modified arrangements of the position of the spools and the direction of film movement. It is obvious that many changes in construction may be made without departing from the scope and spirit of the invention, and I therefore do not limit myself to the particular construction shown and described.

I claim:

In a photographic camera, a film magazine comprising a compartment and including a stationary frame having opposed parallel slots, a bearing roll for the film located near one end of the slots, a pair of spools, shafts for the spools, the ends of said shafts being located within the slots, the spools being movable along the line of the slots with respect to each other and with respect to the compartment whereby the film carried upon the spools will require a minimum amount of space within the compartment for its transfer from one spool to the other.

WILLIAM M. THOMAS.